UNITED STATES PATENT OFFICE.

JOHN JAMES HOOD, OF LONDON, ENGLAND.

PURIFICATION OF SULFUR.

1,331,646.     Specification of Letters Patent.     Patented Feb. 24, 1920.

No Drawing.     Application filed December 13, 1919. Serial No. 344,731.

*To all whom it may concern:*

Be it known that I, JOHN JAMES HOOD, a subject of the King of Great Britain, residing at 4 Canonbury Park North, London, England, have invented new and useful Improvements in the Purification of Sulfur, of which the following is a specification.

The object of this invention is to obtain sulfur of high purity from crude native sulfur, such as is contaminated with pitch or other carbonaceous body, or from the impure sulfur obtained by leaching by a suitable solvent what is known as "spent oxid" in the purification of coal gas.

According to this invention I melt or dissolve in a suitable solvent the impure sulfur and cause the melt or solution to pass through precipitated and ignited magnesia. Or I may employ its natural analogue, namely, magnesite. Before use a precipitated oxid is granulated or the native magnesite is broken up and graded by passing it through sieves and then ignited to expel any water or carbonic acid.

Preferably sulfur which does not contain large amounts of pitch or other impurities is melted and passed through ignited magnesite contained in a vessel which is preferably maintained at a temperature of 120° C.

When the filtering material is exhausted, the sulfur adhering to it may be separated by passing steam or a solvent of sulfur into the vessel and then igniting the filtering material to burn off any bodies adhering to it. The filtering material is then ready for reuse.

When treating "spent oxid" I leach it in a suitable filter with carbon bisulfid or other solvent to extract the sulfur together with such other soluble material as may come into solution from the oxid, and the sulfur solution thus obtained is passed through ignited magnesite in a closed filter or a series of filters. The exhausted filtering material may be freed from the sulfur solution by washing with carbon bisulfid and steaming off; the material having been then ignited is ready for re-use.

When treating sulfur in solution, the efficiency of the above mentioned filtering materials may be increased by first removing some of the tarry matter by agitating the solution of sulfur, for instance, the solution of sulfur in carbon bisulfid, with a small quantity of strong sulfuric acid whereby a considerable quantity of the tarry matters is eliminated and settles out in the form of a black sludge combined with sulfuric acid.

A small quantity of water may be added to the solution of sulfur after treatment with sulfuric acid either before or after the tarry matters precipitated by the sulfuric acid have subsided and been removed. The addition of water to the solution has the effect of precipitating a further quantity of impure matters which may be removed from the liquid by filtration or other known methods.

After the separation of the sulfur solution from the impurities, the sulfur solution is passed through the filtering materials as above described.

In the claims, liquid sulfur includes melted sulfur or sulfur in solution and magnesia includes magnesite.

What I claim is:—

1. Purifying sulfur by passing liquid sulfur through ignited magnesia.

2. Purifying sulfur by first treating the solution of sulfur with a small quantity of strong sulfuric acid, separating the solution of sulfur from the precipitated impurities and passing it through ignited magnesia.

3. Purifying sulfur by first treating the solution of sulfur with a small quantity of strong sulfuric acid, adding a small quantity of water to the solution, removing the precipitated impurities and passing the solution through ignited magnesia.

4. Purifying sulfur by first treating the solution of sulfur with a small quantity of strong sulfuric acid, separating the solution of sulfur from the precipitated impurities, adding a small quantity of water to the solution, removing the precipitated impurities and passing the solution through ignited magnesia.

In testimony that I claim the foregoing as my invention I have signed my name this 24th day of November, 1919.

JOHN JAMES HOOD.